(12) United States Patent
Panasik et al.

(10) Patent No.: US 7,001,124 B2
(45) Date of Patent: Feb. 21, 2006

(54) ANCHOR

(75) Inventors: Cheryl L. Panasik, Elburn, IL (US); Naim Mansour, Villa Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 98 days.

(21) Appl. No.: 10/772,677

(22) Filed: Feb. 5, 2004

(65) Prior Publication Data

US 2005/0175429 A1   Aug. 11, 2005

(51) Int. Cl.
*F16B 13/06* (2006.01)

(52) U.S. Cl. .......................... 411/30; 411/62; 411/80.1; 411/80.5

(58) Field of Classification Search ................. 411/29, 411/30, 31, 59, 60.2, 62, 80.1–80.6
See application file for complete search history.

(56) References Cited

U.S. PATENT DOCUMENTS

| | | | |
|---|---|---|---|
| 3,188,905 A * | 6/1965 | Millet | 411/180.1 |
| 3,413,887 A * | 12/1968 | Von Wolff | 411/62 |
| 4,142,440 A * | 3/1979 | Schefer | 411/42 |
| 4,601,625 A | 7/1986 | Ernst et al. | |
| 4,752,170 A | 6/1988 | McSherry et al. | |
| 5,037,257 A * | 8/1991 | Kubic et al. | 411/30 |
| 5,224,805 A * | 7/1993 | Moretti et al. | 411/30 |
| 5,603,593 A * | 2/1997 | Fischer et al. | 411/55 |
| 6,186,716 B1 | 2/2001 | West et al. | |
| 6,196,780 B1 | 3/2001 | Wakai et al. | |
| 6,354,779 B1 | 3/2002 | West et al. | |
| 6,371,706 B1 * | 4/2002 | Wallace | 411/30 |
| 6,382,892 B1 * | 5/2002 | Hempfling | 411/30 |
| 6,494,653 B1 * | 12/2002 | Remmers | 411/344 |

* cited by examiner

*Primary Examiner*—Flemming Saether
(74) *Attorney, Agent, or Firm*—Lisa M. Soltis; Mark W. Croll; Beem Patent Law Firm

(57) ABSTRACT

A self-drilling anchor for use in a friable material comprises a body having an axis, a flanged rear end, a drilling front end and a generally cylindrical portion therebetween having an outer surface with a thread disposed thereon, wherein the body forks, beginning at a predetermined distance from the flanged rear end, into a first leg and a second leg, the first leg extending forwardly into a drilling tip and having a generally rearward facing shoulder angled obtusely outwardly with respect to the axis, wherein the body has an axial bore for receiving an elongate fastener, the axial bore extending substantially through the flanged end and the generally cylindrical portion and leading to the generally rearward facing shoulder, wherein the anchor has a drilling mode wherein the second leg nests behind the generally rearward facing shoulder of the first leg, and an anchoring mode wherein the legs are pivoted apart from one another.

18 Claims, 3 Drawing Sheets

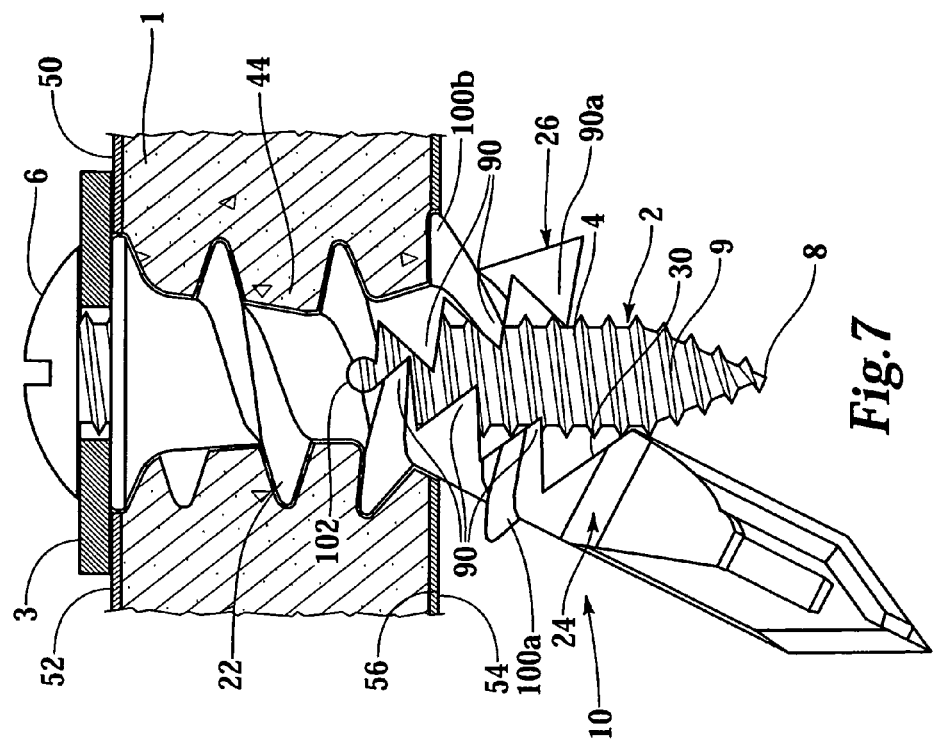
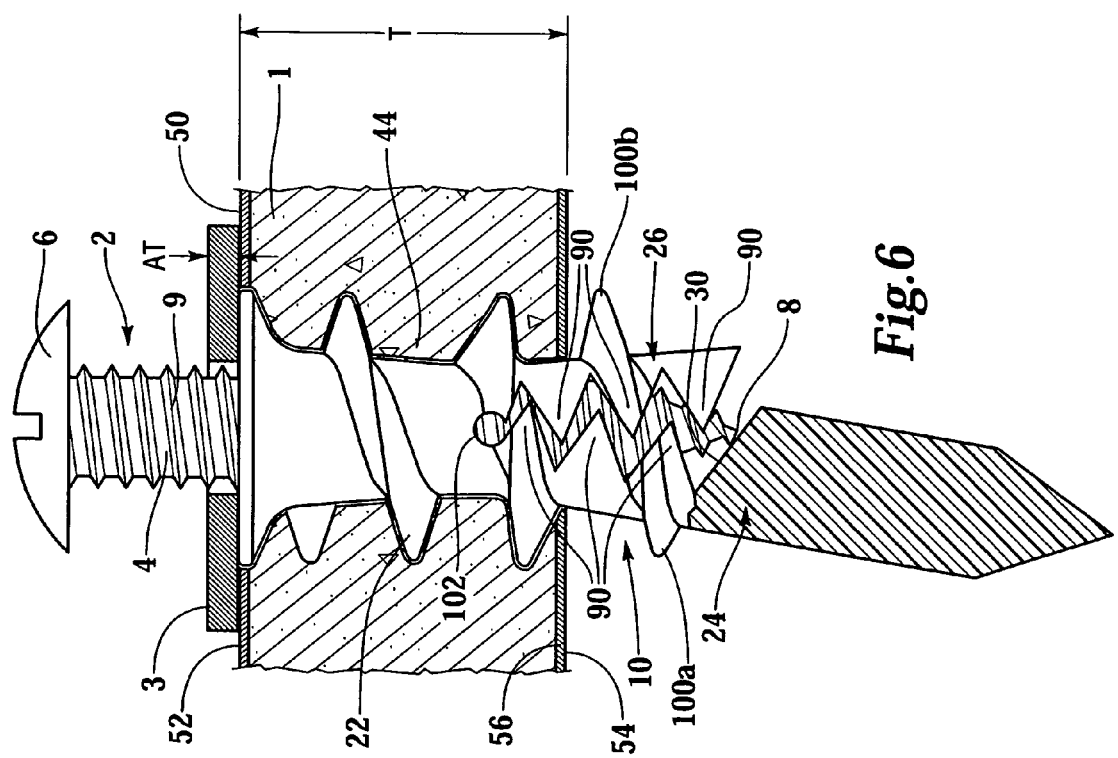

ANCHOR

BACKGROUND OF THE INVENTION

1. Field of the Invention

The present invention is directed to an anchor for use in a friable material, particularly to a self-drilling anchor for use in drywall.

2. Description of the Related Art

Because drywall is a friable material, mounting articles thereto can be difficult. In the past, self-drilling anchors have been used. However, self-drilling anchors have been known to achieve pullout strength of only about 50 to 70 pounds.

For heavier loads, toggle bolts have been used. Toggle bolts have been known to be expensive, unreliable, and difficult to install because they typically are not self-drilling.

What is needed is an anchor for a friable material that is easy to install and provides high pullout strength for heavy loads.

BRIEF SUMMARY OF THE INVENTION

A self-drilling anchor is provided for use in a friable material, the anchor including a body having an axis, a flanged rear end, a drilling front end and a generally cylindrical portion therebetween having an outer surface with a thread disposed thereon, wherein the body forks, beginning at a predetermined distance from the flanged rear end, into a first leg and a second leg, the first leg extending forwardly into a drilling tip and having a generally rearward facing shoulder angled obtusely outwardly with respect to the axis, wherein the body has an axial bore for receiving an elongate fastener, the axial bore extending substantially through the flanged end and the generally cylindrical portion and leading to the generally rearward facing shoulder, wherein the anchor has a drilling mode wherein the second leg nests behind the generally rearward facing shoulder of the first leg, and an anchoring mode wherein the legs are pivoted apart from one another.

The self-drilling anchor may include other aspects, such as the first leg and the second leg being demarcated from one another by a pair of slits beginning at the fork and extending substantially through the outer surface and the thread of the generally cylindrical portion, wherein the slits are on generally opposite sides of the outer surface. The slits may have a zig-zag shape defining crocodile-like interfacing teeth on the legs.

In one embodiment, a self-drilling anchor includes a body having an axis, a flanged rear end, a drilling front end and a generally cylindrical portion therebetween having an outer surface with a thread disposed thereon, said drilling front end comprising a generally flat blade including a first portion having a first angled cutting edge and a first side cutting edge, and a second portion having a second angled cutting edge and a second side cutting edge, wherein said first and second angled cutting edges form a point, said portions being formed on a common line and offset relative to each other along a plane passing through a diameter of said cylindrical portion, wherein said body forks along a pair of zig-zag shaped slits beginning at a predetermined distance from said flanged rear end, into a first leg and a second leg, wherein said zig-zag shaped slits define crocodile-like interfacing teeth on said legs, said first leg extending forwardly into said generally flat blade and having a generally rearward facing shoulder angled obtusely outwardly with respect to said axis, wherein a forwardmost portion of each of said slits follows a perimeter of said generally rearward facing shoulder substantially to a forwardmost and outermost end of said generally rearward facing shoulder, a coaxial central bore in said body for receiving an elongate fastener, said central bore extending substantially through said flanged rear end and said generally cylindrical portion and leading to said generally rearward facing shoulder, wherein said anchor has a drilling mode wherein said second leg nests behind said generally rearward facing shoulder of said first leg, and an anchoring mode wherein said legs are pivoted apart from one another.

These and other features and advantages are evident from the following description of the present invention, with reference to the accompanying drawings.

BRIEF DESCRIPTION OF THE SEVERAL VIEWS OF THE DRAWINGS

FIG. 6 is a partial side-sectional view of the self-drilling anchor installed in a friable material, wherein an elongated fastener is pivoting legs of the anchor into an anchoring mode.

FIG. 7 is a side view of the self-drilling anchor with the elongated fastener pivoting the anchor legs into the anchoring mode.

DETAILED DESCRIPTION OF THE INVENTION

Figure 3:
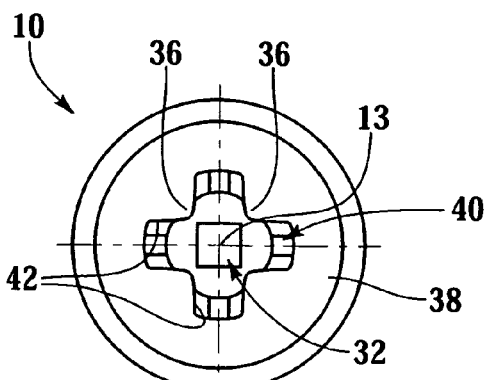
FIG. 3 is an elevation view of a flanged rear end of the self-drilling anchor.
Figure 1:
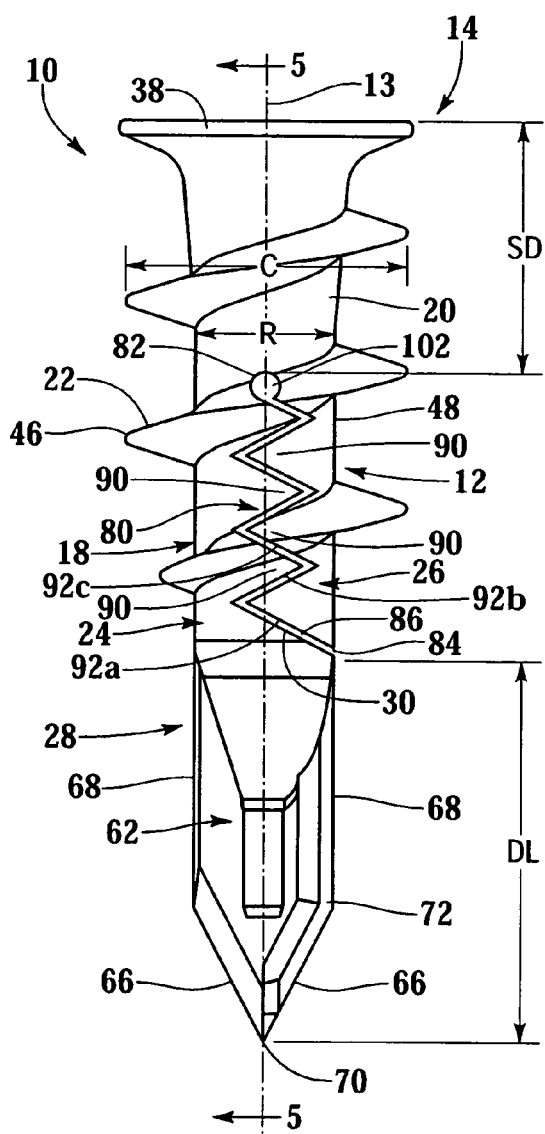
FIG. 1 is side view of a self-drilling anchor in a drilling mode.

Referring to FIGS. 1 and 7, a self-drilling anchor 10 is shown for use in a friable material, such as drywall 1. Anchor 10 includes a body 12 having an axis 13, a flanged rear end 14, a drilling front end 16 and a generally cylindrical central portion 18 therebetween having an outer surface 20 with a thread 22 disposed thereon, wherein body 12 forks, beginning at a predetermined distance SD from flanged rear end 14, into a first leg 24 and a second leg 26, first leg 24 extending forwardly into a drilling tip 28 and having a generally rearward facing shoulder 30 angled obtusely outwardly with respect to axis 13, wherein body 12 has an axial bore 32 for receiving an elongate mounting fastener 2, axial bore 32 extending substantially through flanged end 14 and central portion 18 and leading to shoulder 30, wherein anchor 10 has a drilling mode wherein second leg 26 nests behind shoulder 30 of first leg 24, FIG. 1, and an anchoring mode wherein legs 24, 26 are pivoted apart from one another, FIG. 7.

Anchor 10 is for use in a friable material, such as drywall 1, for mounting an article 3 to drywall 1. Anchor 10 may be formed and is initially positioned in the drilling mode, as shown in FIG. 1, which allows anchor 10 to drill into drywall 1, and external thread 22 engages drywall 1 to hold anchor 10 in drywall 1 with increased pullout strength. After anchor 10 is installed, a fastener 2 is inserted through article 3 and into bore 32 of anchor 10 so that fastener 2 can support article 3. Fastener 2 pivots legs 24, 26 outwardly into the anchoring mode, as shown in FIGS. 6 and 7, so that anchor 10 has increased pullout strength. Anchor 10 provides stronger engagement with drywall 1 and higher pullout strength and sheer strength than fastener 2 alone.

The friable material may be one of several friable materials used in the construction industry wherein it is desired to mount an article 3 to the friable material in order to increase the amount of load that can be mounted to the friable material. An example of a friable material is gypsum based drywall 1, such as the gypsum drywall sold under the trademark SHEETROCK by United States Gypsum. Drywall typically has a thickness T of ½ inch or ⅝ inch, but it can be obtained in other thicknesses, such as ⅜ inch.

Turning to FIGS. 6 and 7, fastener 2 is preferably a threaded fastener, such as a mounting screw, having an elongate shank 4 with a head 6 at one end and a tip 8 at the other. Shank 4 of fastener 2 includes threads 9 which engage with bore 32 of anchor 10. Threads 9 of fastener 2 can be of a standardized thread form, such as Unified Coarse (UNC) or Unified Fine (UNF) threading, or threads 9 can be of a specialized thread form. For example, fastener 2 may be a standard #6, #7 or #8 UNC screw, and fastener 2 may have a Phillips recess in head 6.

Fastener 2 may have different lengths to accommodate different thicknesses AT of article 3. Preferably, fastener 2 is long enough to extend through article 3 and bore 32 so that fastener 2 engages shoulder 30 and pivots legs 24, 26 outwardly to wedge into drywall 1. Fastener 2 may also pivot second leg 26 outwardly to wedge into drywall 1. For example, for an anchor 10 having a length of about 1.67 inches, fastener 2 may have a length of between about 1 inch and about 2 inches, preferably between about 1¼ inches and about 1¾ inches, still more preferably about 1½ inches.

Anchor

Figure 4:
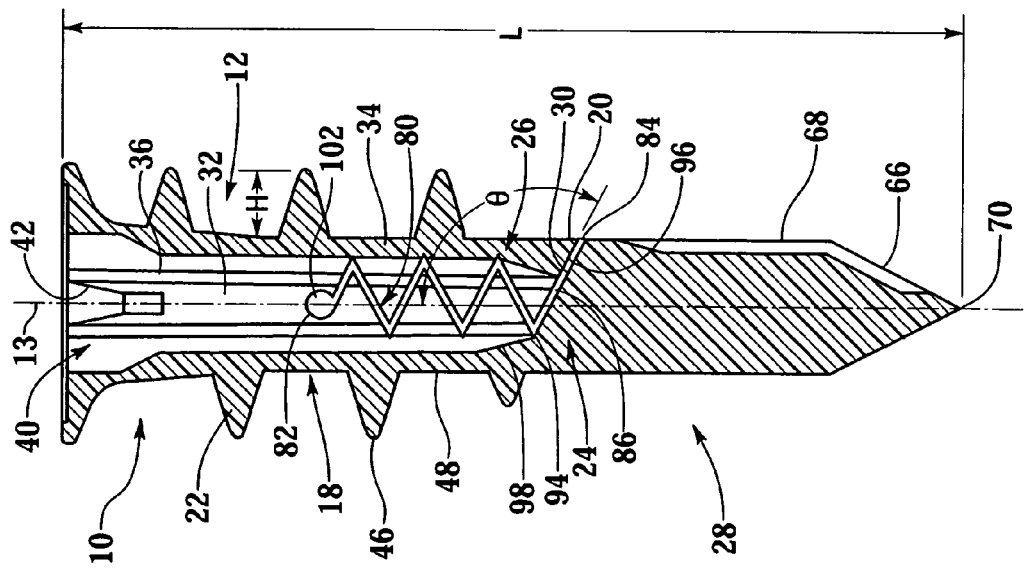
FIG. 4 is a sectional view of the self-drilling anchor in the drilling mode taken along line 4—4 in FIG. 2.

Turning to FIGS. 1 and 4, anchor 10 includes a body 12 with a flanged rear end 14 and a drilling front end 16 generally opposite flanged end 14, with a generally cylindrical central portion 18 between flanged end 14 and drilling end 16. Anchor body 12 has a wall 34 that surrounds a generally axial bore 32 for receiving fastener 2, wherein bore 32 has an elongated generally cylindrical portion. Preferably, anchor 10 is made from a heavy duty plastic, such as glass filled fiber reinforced nylon or polyetherimide glass filled reinforced ULTEM, however, anchor 10 can be made from other materials so long as it is strong enough to withstand pullout and other forces encountered by anchor 10.

Anchor 10 has an axial length L that is a combination of the length N of neck 60, length TL of thread 22 and length DL of drilling tip 28 (described below). A shorter anchor 10 is preferred, so long as N, TL, and DL are each long enough, as described below, because it is less expensive to manufacture, easier to handle and to keep stable during installation, and it has a shorter drive time so that a user can install a plurality of anchors 10 in a relatively short period of time with a minimum amount of effort. In one embodiment, anchor 10 has a length L of between about 1.5 inches and about 2 inches, preferably between about 1.6 inches and about 1.7 inches, still more preferably about 1.67 inches.

Figure 5:
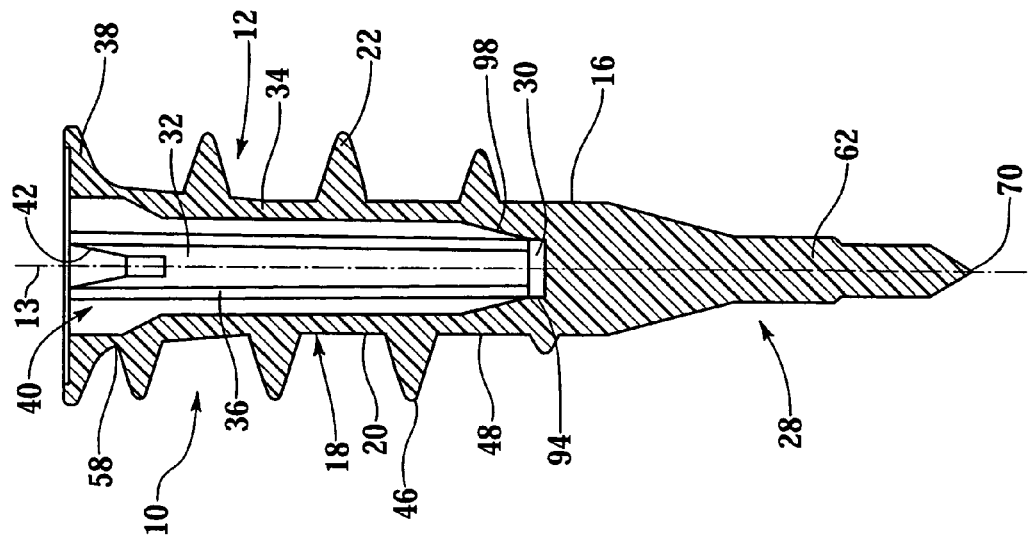
FIG. 5 is a sectional view of the self-drilling anchor in the drilling mode taken along line 5—5 in FIG. 1.

Bore 32 is sized to accommodate fastener 2. Preferably, bore 32 has a diameter that is large enough to receive a #8 screw, or fasteners having a smaller diameter. Bore 32 extends through flanged end 14 and central portion 18 up to shoulder 30. In one embodiment, shown in FIGS. 4 and 5, a portion 98 of bore 32 proximate shoulder 30 is tapered toward shoulder 30 to provide for better engagement between fastener 2 and legs 24, 26 so that legs 24, 25 are pivoted outwardly more effectively. Tapered portion 98 may taper at an angle with respect to axis 13 of between about 5° and about 25°, preferably between about 10° and about 20°, still more preferably about 15°, and tapered portion 98 may begin at an axial length away from shoulder 30 of between about 0.1 inches and about 0.3 inches, preferably between about 0.15 inches and about 0.17 inches, still more preferably about 0.16 inches.

Wall 34 may include a set of at least 3, and preferably 4 splines 36 protruding radially inwardly into bore 32, wherein splines 36 are adapted to engage fastener 2. Fastener threads 9 tap mating threads in splines 36 so that fastener 2 is threadingly engaged with splines 36. Splines 36 extend substantially through the entire length of bore 32.

The effective inner diameter of bore 32 with splines 36 should be smaller than the outside diameter, or crest diameter of fastener 2, but not as small as the root diameter of fastener 2, so that splines 36 are tapped by fastener 2 to form mating threads. Preferably, the height of splines 36 from the interior of wall 34 is selected so that the effective inner diameter of bore 32 is small enough so that the threading of a #6 fastener 2, with an outer diameter of about 0.136 inch, can tap splines 36, and so that the inner diameter of wall 34 is large enough so that the threading of a # 8 fastener 2, having an outer diameter of about 0.164 inch, only taps splines 36 and does not tap wall 34. In a preferred embodiment, bore 32 has an inner diameter at wall 34 of between about 0.17 inch and about 0.21 inch, preferably between about 0.18 inch and about 0.2 inch, still more preferably about 0.19 inch, and splines 36 have a height of between about 0.015 inch and about 0.045 inch, preferably between about 0.025 inch and about 0.035 inch, still more preferably about 0.03 inch, so that the effective inner diameter of bore 32 at splines 36 is between about 0.11 inch and about 0.16 inch, preferably between about 0.12 inch and about 0.145 inch, still more preferably about 0.13 inch.

Preferably, splines 36 are in a configuration that accommodates mounting fasteners of various thread diameters, as with the splines in the commonly assigned U.S. Pat. No. 5,558,479 to McElderry, the disclosure of which is incorporated herein by reference.

Flanged end 14 of anchor body 12 includes a flange 38 having torque transmitting surfaces therein for being driven by a driver (not shown), such as surfaces 42 in a Phillips-type recess 40, which may be a Phillips Square Drive to minimize cam-out. Anchor 10 is preferably manually drivable by a hand-powered screwdriver, which may be driven by a Phillips screwdriver or the like, or by a power driver.

Figure 2:
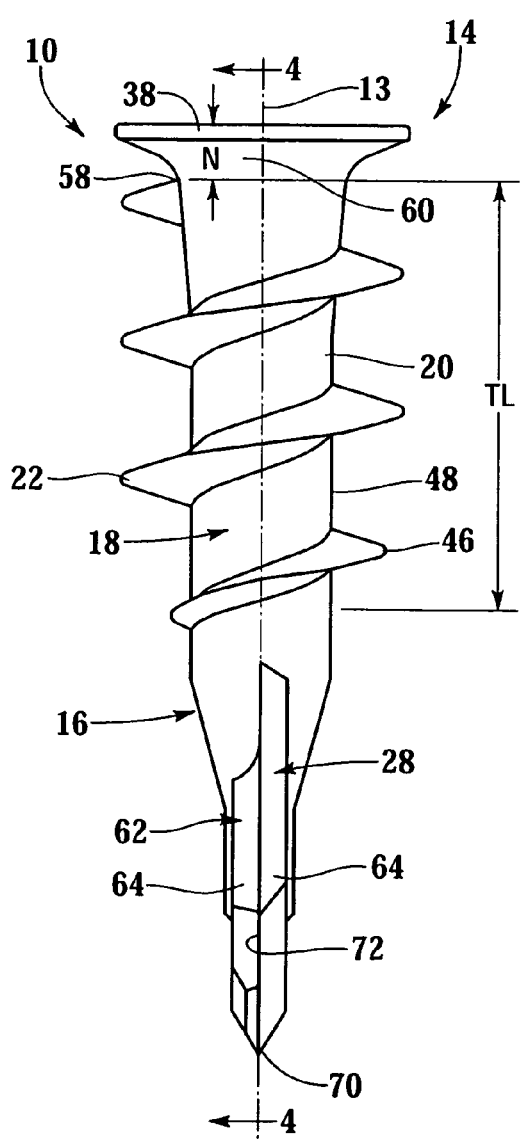
FIG. 2 is a plan view of the self-drilling anchor in the drilling mode.

Continuing with FIGS. 1, 4 and 6, thread 22 is disposed on an outer surface 20 of central portion 18 and is provided for engagement with drywall 1 when anchor 10 is installed so that the load of article 3 will be supported by drywall 1. Thread 22 taps a mating thread 44 in drywall 1 so that an engagement between thread 22 and drywall 1 is accomplished. Thread 22 is preferably generally helical, and includes a crest 46 with a crest diameter C and a root 48 having a root diameter R, wherein the distance between crest 46 and root 48, or the thread height H, is relatively large to maximize the surface area of thread 22 encountered by drywall 1, increasing the pullout strength. The crest diameter C of thread 2 may remain essentially the same along the entire length of thread 22. In one embodiment, the crest diameter C tapers slightly proximate drilling tip 28, as shown in FIG. 2. In one embodiment, the diameter C of crest 46 is about twice the diameter R of root 48.

It has been found that engagement with paper 56 on the rear surface 54 of drywall 1 provides a substantial portion of the grip between anchor 10 and drywall 1, therefore it is preferably that the axial length TL (FIG. 2) of thread 22 be long enough so that at least about ¾ of a turn of thread 22 is engaged behind drywall 1 so that thread 22 engages the paper 56 on rear drywall surface 54 when anchor 10 is forced into the anchoring mode, see FIG. 7. In one embodiment, the axial length TL of thread 22 is between about 0.6 inches and about 1 inch, preferably between about 0.7 inches and about 0.8 inches, still more preferably about ¾ inch.

Turning to FIGS. 2 and 6, the upper end 58 of thread 22 is spaced from flange 38 to form a neck 60 between flange 38 and thread end 58. Neck 60 allows the upper surface of flange 38 to seat at or below the level of drywall front surface 50, as shown in FIG. 6, because the discontinuation of thread 22 at neck 60 before reaching flange 38 creates a space in drywall mating thread 44, which allows compression of adjacent drywall 1 by flange 38. Also, neck 60 ensures that thread 22 is spaced away from paper 52 on front drywall surface 50, so that thread 22 does not engage paper 52 and twist it, creating an undesirable appearance at front drywall surface 50. Neck 60 can have a length N of between about 0.03 inch and about 0.1 inch, preferably about 0.07 inch.

Turning back to FIGS. 1 and 2, drilling end 16 is located generally opposite flanged end 14. A drilling tip 28 is connected to body at drilling end 16 to allow anchor 10 to drill through drywall 1 as anchor 10 is driven by a user so that a separate drilling step is not required. Drilling tip 28 extends forwardly from first leg 24 so that drilling tip 28 is part of first leg 24.

Drilling tip 28 may be one of many configurations, such as a generally cylindrical drilling blade having one or more helical flutes for drilling out drywall 1, but preferably drilling tip 28 is a generally flat drilling blade 62 because it more effectively reams out a hole in drywall 1 and clears dust. Drilling blade 62 may have a pair of portions 64, wherein each portion 64 has an angled cutting edge 66 and a side cutting edge 68. Preferably side cutting edges 68 are preferably generally parallel to anchor axis 13, and angled cutting edges 66 are angled forwardly and laterally inwardly together to form a pointed tip 70. Pointed tip 70 is relatively sharp to prevent walking along front drywall surface 50 during installation of anchor 10. Side cutting edges 68 and angled cutting edges 66 are relatively sharp in order to cut and remove drywall during installation.

Portions 64 are formed on, and are offset relative to each other along a plane passing through a diameter of anchor body 12, wherein the plane is generally parallel to drilling blade 62. The offset orientation of portions 64 form flutes 72 disposed on the underside of each portion 64, wherein each flute 72 extends along the length of the corresponding side cutting edge 68 and angled cutting edge 66. Flutes 72 also help to quickly remove material, such as gypsum dust, from the hole being drilled in drywall 1. An example of a preferred drill blade is described in the commonly assigned U.S. Pat. No. 6,382,892 to Hempfling, the disclosure of which is incorporated herein by reference.

Preferably, the axial length DL of drilling tip 28 is at least as large as the thickness T of drywall 1, so that drilling tip 28 will complete its drilling before thread 22 begins to engage drywall 1. This is preferred because drilling into a material tends to advance axially through the material substantially slower than driving through the material with threading. It is preferred that the drilling of drywall 1 be complete before thread 22 engages drywall 1 so that thread 22 does not ream out a hole in drywall 1. In one embodiment, drilling tip 28 has a length DL of between about 0.6 inches and about 1 inch, preferably between about 0.7 inches and about 0.8 inch, still more preferably about ¾ inch.

Turning back to FIG. 1, anchor body 12 forks at first end 82 of slits 80 (described below), which is spaced a predetermined distance SD from flanged end 14 into a first leg 24 and a second leg 26. First leg 24 extends forwardly into drilling tip 28 and includes generally rearward facing shoulder 30, which is angled obtusely outwardly with respect to axis 13, as shown in FIG. 4. When anchor 10 is in the drilling mode, second leg 26 is nested behind first leg 24 so that second leg 26 does not interfere with the process of driving anchor 10 into drywall 1.

In one embodiment, first leg 24 is demarcated from second leg 26 by a pair of slits 80 extending substantially through outer surface 20 of anchor wall 34 and through thread 22, wherein one slit 80 is on generally the opposite side of outer surface 20 from the other slit 80. In one embodiment, slits 80 are about 180° from each other on outer wall 34. In one embodiment, slits 80 split anchor wall 34 and thread 22, so that a portion 100a, 100b of thread 22 is on each leg 24, 26 (see FIG. 6).

Slits 80 extend generally axially along body 12 from a first end 82 spaced by the predetermined distance SD from flanged end 14 toward a second end 84 proximate drilling end 16. A forwardmost portion 86 of each slit 80 extends generally laterally to follow a perimeter of shoulder 30 substantially to a forwardmost and outermost end 96 of shoulder 30 at outer wall 34. Body 12 forks along slits 80 into first leg 24 and second leg 26. Slits 80 may extend to a position proximate outer surface 20 so that there is a connection or land between first leg 24 and second leg 26 at second end 84 of slit 80, but preferably slits 80 extend completely through wall 34 to outer surface 20 at second end 84, as shown in FIG. 1, so that legs 24, 26 can more easily pivot apart when fastener 2 is driven through anchor 10.

In one embodiment, each slit 80 generally has a zig-zag shape that defines a plurality of crocodile-like interfacing teeth 90 on legs 24, 26. Each slit 80 includes a plurality of generally linear portions, wherein each portion is angled acutely with respect to its adjacent portions. In the embodiment shown in FIG. 1, a first linear portion 92a extends from second end 82 of slit 80 and is angled acutely with respect to anchor wall 34 so that first portion 92a extends rearwardly and laterally inwardly from anchor wall 34, a second portion 92b is angled acutely with respect to first portion 92a so that second portion 92b extends rearwardly but laterally in the opposite direction as first portion 92a, and a third portion 92c is angled acutely with respect to second portion 92b so that third portion 92c extends rearwardly but laterally in the opposite direction as second portion 92b, or laterally in the same direction as first portion 92a. In one embodiment, each portion 92a, 92b, 92c, etc. of zig-zag shaped slit 80 is angled from adjacent portions by an angle of between about 45° and about 85°, preferably between about 50° and about 75°, still more preferably about 65°. In one embodiment, first portions 92a of slits 80 defines generally rearward facing shoulder 30 on first leg 24.

Continuing with FIG. 1, teeth 90 interlock together and interface when anchor 10 is in the drilling mode. Interlocked teeth 90 help stabilize anchor body 12 and prevent it from twisting or buckling as anchor 10 is driven into drywall 1, while still allowing legs 24, 26 to be pivoted apart and wedged into drywall 1. It is also believed that teeth 90 increase pullout by engaging with drywall 1 at outer surface 20 when anchor 10 is in the anchoring mode.

Teeth 90 also aid in the pullout strength of anchor 10 because teeth 90 can fit between adjacent threads 9 of fastener 2, as shown with tooth 90a in FIG. 7, so that teeth 90 engage fastener 2 and wedge it into place. In this way, teeth 90 act as a thread lock on both sides of fastener 2 which causes fastener 2 to be more tightly engaged with anchor 10, helping to block fastener 2 from pulling out of engagement with anchor 10. Fastener threads 9 increase pullout strength by engaging and pushing teeth 90 to further pivot legs 24, 26 outwardly to wedge into drywall 1.

Turning to FIGS. 4, and 6, first leg 24 includes a shoulder 30 which is generally rearward facing so that shoulder 30 is engaged by fastener 2 to pivot first leg 24 apart from second leg 26 as fastener 2 is driven though anchor 10. As first leg 24 is deflected by fastener 2, first leg 24 is wedged into drywall 1, providing a higher pullout strength than if first leg 24 were to remain unpivoted. Shoulder 30 is angled obtusely outwardly with respect to axis 13, so that fastener tip 9 is able to slide along shoulder 30 and deflect first leg 24 so it pivots laterally away from fastener 2. Shoulder 30 extends from a rearmost and innermost end 94 laterally outwardly across bore 32 to a forwardmost and outermost end 96 at second end 84 of slits 80. Shoulder 30 ensures that fastener 2 does not screw into drilling tip 28, which would prevent first leg 24 from being pivoted.

The axial length between flanged end 14 and shoulder 30 is selected to optimize the pivoting of legs 24, 26 to produce the highest pullout strength. The axial length between flanged end 14 and shoulder 20 may be between about 3/4 inch and about 1 inch, preferably between about 0.8 inches and about 0.9 inches, still more preferably about 0.83 inches.

In one embodiment, shoulder 30 is a surface that is generally angled obtusely outwardly with respect to anchor axis 13 so that shoulder 30 extends forwardly and laterally outwardly. In one embodiment, shoulder 30 extends from one lateral side of axis 13 substantially across bore 32 to the other side of axis 13 so that as fastener 2 is driven, tip 8 contacts an angled portion of shoulder 30 to ensure that tip 8 slides along shoulder 30 to deflect and pivot first leg 24 laterally outwardly. In one embodiment, shoulder 30 is generally planar and forms an angle ? with respect to axis 13 when anchor is in the drilling mode (FIGS. 1 and 4) of between about 100° and about 160°, preferably between about 120° and about 150°, still more preferably about 130°. Shoulder 30 should be smooth and substantially free of defects so that fastener tip 8 easily slides along shoulder 30 rather than catching or sticking, which might cause fastener 2 to screw into first leg 24.

Continuing with FIG. 6, second leg 26 is also deflected by fastener 2 so that second leg 26 also is wedged into drywall 1 to increase the pullout strength of anchor 10. In one embodiment, shown in FIGS. 4 and 5, a portion 98 of anchor bore 32 proximate drilling end 16 is tapered toward drilling tip 28 so that as fastener 2 is driven through bore 32, it engages tapered portion 98 to more effectively deflect legs 24, 26 laterally outwardly away from fastener 2.

As legs 24, 26 are pivoted away from one another by fastener 2, they engage and are wedged into drywall 1, as shown in FIG. 7. As legs 24, 26 are wedged into drywall 1, anchor 10 becomes more resistant to pullout. Preferably, a portion 100a, 100b of thread 22 on each leg 24, 26 is also wedged into back drywall surface 54, so that the thread portions 10a, 100b can act as barbs that more tightly engage paper 56 on back drywall surface 54 to provide even stronger resistance to pullout.

Surprisingly, it has been found that anchor 10, with legs 24, 26 that are deflected outwardly by fastener 2 doubles, and in some cases triples, the pullout strength anchor 10 can achieve in drywall 1. An anchor having similar dimensions, but without shoulder 30 that is engaged by fastener 2 so that legs 24, 26 are pivoted outwardly, have been known to achieve a maximum pullout strength of about 70 pounds, with most anchors typically being able to withstand about 50 pounds of pullout. It has been found through experimentation that anchor 10 can achieve pullout strengths as high as about 170 pounds, with an average pullout strength in experiments of about 145 pounds.

Turning again to FIG. 1, if the selected spaced distance SD between first end 82 of each slit 80 and flanged end 14 is too small, first end 82 will be too close to flanged end 14, and legs 24, 26 will tend to be pivoted outwardly too far and too close to front drywall surface 50, causing damage to drywall 1, such as buckling, and premature pullout of anchor 10 and fastener 2. If the selected distance SD is too large, first end 82 will be too far from flanged end 14, and legs 24, 26 will not be pivoted outwardly far enough, so that legs 24, 26 will not be adequately engaged with drywall 1 and will not optimize the pullout strength achieved by anchor 10. First end 82 of slits 80 may be spaced a distance SD from flanged end 14 that is between about 20% and about 50%, preferably between 25% and about 40%, still more preferably about 30% of the total length L of anchor 10. It may be desirable to position first end 82 at a predetermined depth within drywall 1, so that spaced distance SD may be between about 75% and about 125%, preferably between 90% and about 105%, still more preferably about 100% of the thickness T of drywall 1. First end 82 may spaced from flanged end 14 by a distance SD of between about 1/4 inch and about 3/4 inch, preferably between about 0.4 inches and about 0.55 inches, still more preferably about 1/2 inch.

In one embodiment, first end 82 of each slit 80 is rounded to avoid the formation of stress concentrations at first end 82, which would tend to crack or split anchor body 12 between first end 82 and flanged end 14 as legs 24, 26 are pivoted outwardly. Anchor 10 may also include an eyelet 102 at first end 82. Eyelet 102 may be generally circular, as shown in FIG. 1, ellipsoidal, or of other generally curved geometries. Preferably, eyelet 102 is larger than slit 80, so that legs 24, 26 can over-pivot slightly before body 12 begins to crack. In one embodiment, eyelet 102 has a diameter that is between about 1.5 and about 4, preferably between about 2 and about 3, still more preferably about 2.5 times larger than the width of each slit 80 when anchor 10 is in the drilling mode. In one embodiment, eyelet 102 has a diameter of about 0.05 inch, and slit has a width of about 0.02 inch.

Method of Use

The method by which anchor 10 is used includes the steps of driving anchor 10 while in the drilling mode into drywall 1 so that drilling tip 28 drills through drywall 1, engaging external thread 22 with drywall 1, inserting elongated fastener 2 into anchor bore 32 so that a fastener tip 8 engages and slides along shoulder 30, continuing to drive fastener 2 through anchor 10 so that fastener 2 continues in a generally forward direction, deflecting shoulder 30 and pivoting first leg 24 outwardly, pivoting legs 24, 26 apart from one another until legs 24, 26 are forced into the pivoted positions of the anchoring mode, and wedging legs 24, 26 against drywall 1, which increases the pullout strength of anchor 10.

Driving anchor 10 into drywall 1 is typically accomplished by placing drilling tip 28 at a desired location on front drywall surface 50, engaging the driver of a rotary driving tool (not shown), such as a Phillips screwdriver, with torque transmitting surfaces 42, such as by inserting the driver into recess 40 in flange 38, and rotating anchor 10 so that drilling tip 28 drills into drywall 1. Eventually drilling tip 28 drills through drywall 1 and external thread 22 of anchor engages drywall 1 to tap mating threads 44 in drywall 1, which continues to drive anchor 10 forward until flange 38 encounters drywall 1, at which point flange 38 may be seated into drywall 1 so that anchor 10 is flush or countersunk with respect to front drywall surface 50.

Fastener 2 is inserted into bore 32 by placing fastener tip 8 into recess 40. Fastener 2 is rotated with a rotary driving tool, such as a screwdriver, so that fastener threads 9 engage splines 36 to form mating threads in splines 36, driving fastener 2 through anchor bore 32.

Eventually, as fastener 2 is driven through bore 32, fastener tip 9 will encounter shoulder 30 at the end of anchor bore 32. As fastener 2 is driven further in the forward direction, fastener tip 9 slides along shoulder 30, causing shoulder 30 to deflect laterally outwardly away from fastener 2 so that first leg 24 pivots away from fastener 2. A portion of fastener 2 also deflects second leg 26 outwardly. In one method, a portion of fastener 2 engages tapered portion 98 of bore 32 to pivot second leg 26 outwardly away from fastener 2. As legs 24, 26 are deflected outwardly, they are wedged against drywall 1, causing anchor thread 22 to further engage drywall 1, increasing the pullout strength of anchor 10. Preferably, thread 22 is positioned axially on anchor body 12 so that the wedging step includes wedging a portion 100a, 100b of thread 22 on at least one of legs 24, 26 into drywall 1, as shown in FIG. 7.

The self-drilling anchor of the present invention provides an apparatus that is easy to install so that it requires no additional steps over a traditional self-drilling anchor, while providing increased pullout strength comparable to toggle bolts or other more complicated apparatus. This provides a significant advantage to the user, in that the method of installing is essentially identical to self-drilling anchor, but still provides high pullout strength associated with harder-to-install toggle bolts, without adding difficulty to the installation.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A self-drilling anchor for use in a friable material, comprising:
   a body having an axis, a flanged rear end, a drilling front end and a generally cylindrical portion therebetween having an outer surface with a thread disposed thereon;
   wherein said body forks, beginning at a predetermined distance from said flanged rear end, into a first leg and a second leg, said first leg extending forwardly into a drilling tip and having a generally rearward facing shoulder angled obtusely outwardly with respect to said axis;
   wherein said body has an axial bore for receiving an elongate fastener, said axial bore extending substantially through said flanged end and said generally cylindrical portion and leading to said generally rearward facing shoulder;
   wherein said anchor has a drilling mode wherein said second leg nests behind said generally rearward facing shoulder of said first leg, and an anchoring mode wherein said legs are pivoted apart from one another;
   wherein said first leg and said second leg are demarcated from one another by a pair of slits beginning at said fork and extending substantially through said outer surface and said thread of said generally cylindrical portion, said slits being on generally opposite sides of said outer surface; and
   wherein said slits have a zig-zag shape defining a plurality of similar shaped interfacing teeth on each of said legs.

2. A self-drilling anchor according to claim 1, wherein a forwardmost portion of each of said slits follows a perimeter of said generally rearward facing shoulder substantially to a forwardmost and outermost end of said generally rearward facing shoulder.

3. A self-drilling anchor according to claim 1, wherein said elongated fastener includes threads wherein said crocodile-like teeth engage said elongated fastener threads when said self-drilling anchor is in said anchoring mode.

4. A self-drilling anchor according to claim 1, wherein a rearmost end of each one of said pair of slits is rounded.

5. A self-drilling anchor according to claim 1, wherein a rearmost end of each one of said pair of slits includes an eyelet.

6. A self-drilling anchor according to claim 1, wherein said drilling tip comprises a generally flat drilling blade having cutting surfaces and a pointed tip.

7. A self-drilling anchor according to claim 1, wherein said elongated fastener is inserted into said axial bore until a tip of said elongated fastener engages and slides along said generally rearward facing shoulder and continues in a generally forward direction until said legs are forced into said anchoring mode.

8. A self-drilling anchor according to claim 1, wherein a portion of said axial bore proximate said generally rearward facing shoulder is tapered toward said generally rearward facing shoulder.

9. A self-drilling anchor according to claim 1, wherein said generally rearward facing shoulder is angled obtusely outwardly with respect to said axis at an angle of between about 100° and about 160°.

10. A self-drilling anchor according to claim 1, wherein said generally rearward facing shoulder is angled obtusely outwardly with respect to said axis at an angle of between about 120° and about 150°.

11. A self-drilling anchor according to claim 1, wherein said generally rearward facing shoulder is angled obtusely outwardly with respect to said axis at an angle of about 130°.

12. A self-drilling anchor according to claim 1, wherein a first end of said slits is spaced a distance from said flanged rear end that is between about 20% and about 50% of a total length of said anchor.

13. A self-drilling anchor according to claim 1, wherein a first end of said slits is spaced a distance from said flanged rear end that is between about 25% and about 40% of a total length of said anchor.

14. A self-drilling anchor according to claim 1, wherein a first end of said slits is spaced a distance from said flanged rear end that is about 30% of a total length of said anchor.

15. A self-drilling anchor according to claim 1, wherein a first end of said slits is spaced a distance from said flanged rear end that is between about 75% and about 125% of a thickness of said friable material.

16. A self-drilling anchor according to claim 1, wherein a first end of said slits is spaced a distance from said flanged rear end that is between about 90% and about 105% of a thickness of said friable material.

17. A self-drilling anchor according to claim 1, wherein a first end of said slits is spaced a distance from said flanged rear end that is about 100% of a thickness of said friable material.

18. A self-drilling anchor for use in a friable material, comprising:
- a body having an axis, a flanged rear end, a drilling front end and a generally cylindrical portion therebetween having an outer surface with a thread disposed thereon;
- said drilling front end comprising a generally flat blade including a first portion having a first angled cutting edge and a first side cutting edge, and a second portion having a second angled cutting edge and a second side cutting edge, wherein said first and second angled cutting edges form a point, said portions being formed on a common line and offset relative to each other along a plane passing through a diameter of said cylindrical portion;
- wherein said body forks along a pair of zig-zag shaped slits beginning at a predetermined distance from said flanged rear end, into a first leg and a second leg, wherein said zig-zag shaped slits define a pluaality of similar shaped interfacing teeth on each of said legs;
- said first leg extending forwardly into said generally flat blade and having a generally rearward facing shoulder angled obtusely outwardly with respect to said axis, wherein a forwardmost portion of each of said slits follows a perimeter of said generally rearward facing shoulder substantially to a forwardmost and outermost end of said generally rearward facing shoulder;
- a coaxial central bore in said body for receiving an elongate fastener, said central bore extending substantially through said flanged rear end and said generally cylindrical portion and leading to said generally rearward facing shoulder;
- wherein said anchor has a drilling mode wherein said second leg nests behind said generally rearward facing shoulder of said first leg, and an anchoring mode wherein said legs are pivoted apart from one another.

* * * * *